(12) United States Patent
Fine

(10) Patent No.: US 6,619,671 B1
(45) Date of Patent: Sep. 16, 2003

(54) POWER WHEEL FOR A TRAILER TONGUE JACK

(76) Inventor: Boyce Fine, 28 N. Redwood Dr., Sallisaw, OK (US) 74955

( * ) Notice: Subject to any disclaimer, the term of this patent is extended or adjusted under 35 U.S.C. 154(b) by 0 days.

(21) Appl. No.: 10/038,955

(22) Filed: Jan. 2, 2002

(51) Int. Cl.$^7$ ................................................ B60S 13/00
(52) U.S. Cl. .......................... 280/3; 280/475; 280/767
(58) Field of Search ......................... 280/3, 475, 767, 280/477

(56) References Cited

U.S. PATENT DOCUMENTS

| | | | |
|---|---|---|---|
| 1,373,352 A | 3/1921 | Rice | |
| 2,814,505 A | * 11/1957 | Kelly | 280/250 |
| 3,183,013 A | 5/1965 | Brown | 280/3 |
| 3,269,740 A | 8/1966 | Hutchinson | 280/3 |
| 3,439,764 A | 4/1969 | Kimball | 180/12 |
| 3,482,847 A | 12/1969 | Hart | 280/3 |
| 3,738,672 A | 6/1973 | Dalton | 280/3 |
| 4,168,074 A | 9/1979 | Morris | 280/3 |
| 4,210,217 A | 7/1980 | Lachowicz | 180/13 |
| 4,227,706 A | 10/1980 | Morris | 280/3 |
| 4,416,460 A | 11/1983 | Morris | 280/3 |
| 4,463,961 A | 8/1984 | Fernandez | 280/3 |
| 4,470,564 A | 9/1984 | Johnson | 244/50 |
| 4,860,841 A | 8/1989 | Sacco | 180/13 |
| 5,016,900 A | * 5/1991 | McCully | 280/477 |
| 5,338,047 A | 8/1994 | Knisley | 280/3 |

FOREIGN PATENT DOCUMENTS

FR 0112735 A1 * 7/1984

* cited by examiner

*Primary Examiner*—Kevin Hurley
(74) *Attorney, Agent, or Firm*—Gable & Gotwals; Paul H. Johnson

(57) ABSTRACT

An improved jack for horizontally extending trailer tongue including a bracket attached to the trailer tongue, a longitudinal shaft pivotally supported to the bracket and pivotal between a substantially vertical position and a substantially horizontal position, a wheel housing supported at a lower end of the shaft, a wheel rotatably supported by the housing, a lower portion of the shaft being rotatable about a shaft longitudinal axis, a crank arm rotatably extending from said wheel housing and having a drive gear thereon, and a driven gear affixed to the wheel, the driven gear being coupled for rotation when the drive gear is rotated to cause the wheel to rotate for moving the trailer when the wheel is in contact with the earth's surface.

17 Claims, 4 Drawing Sheets

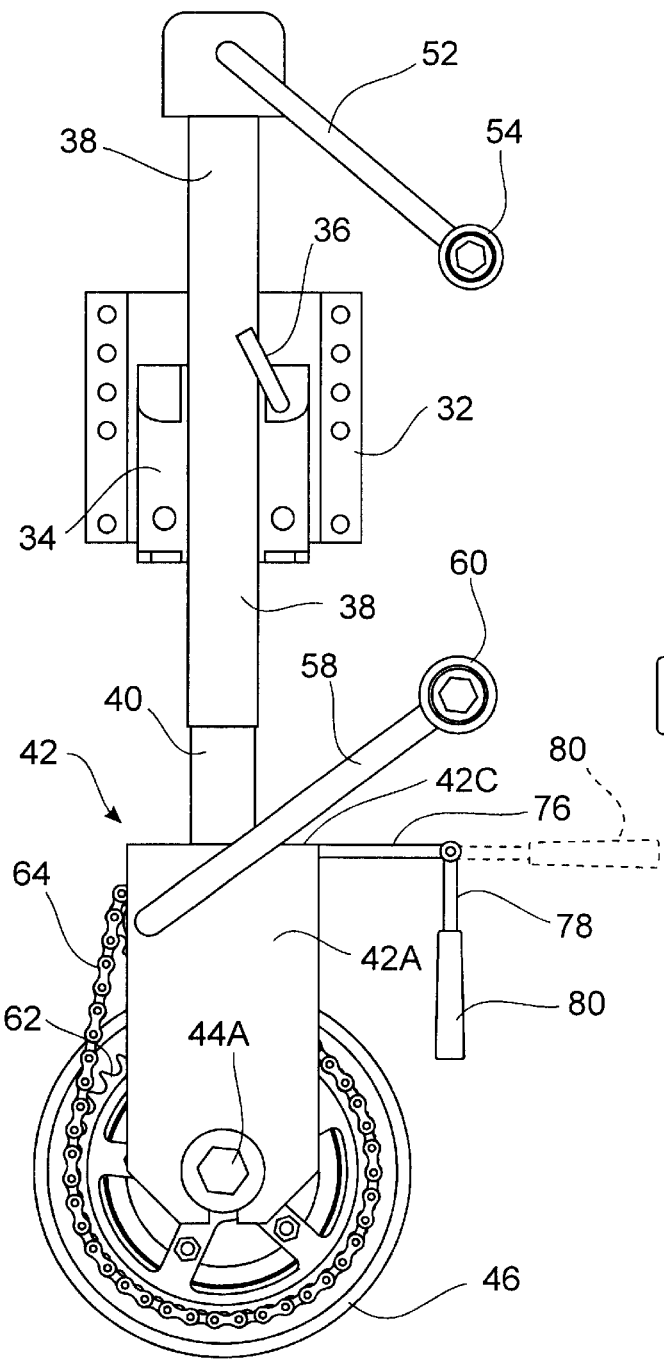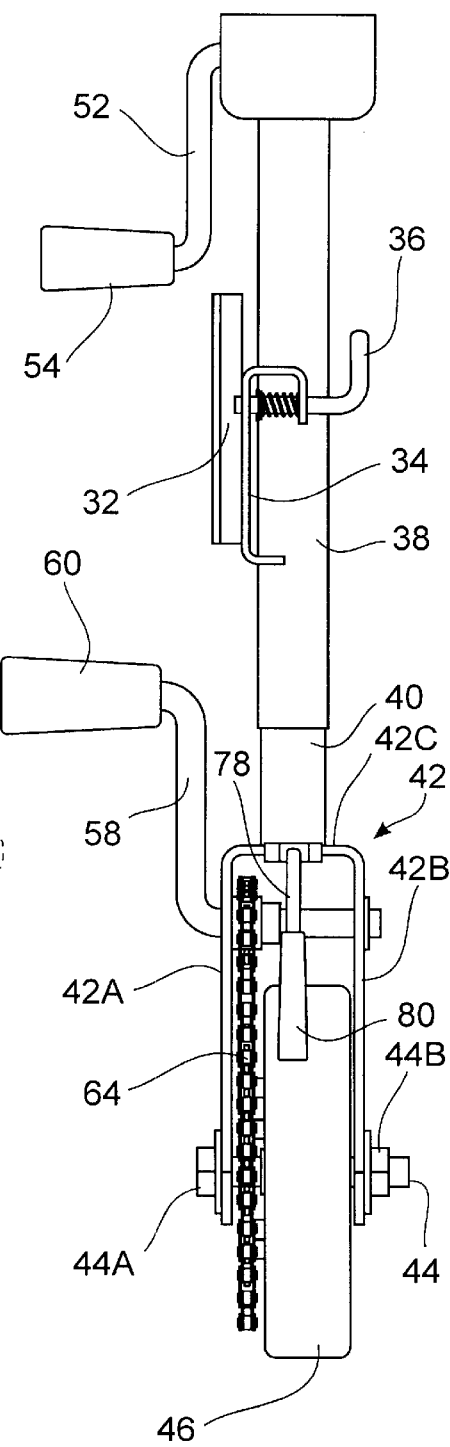

FIG. 6
FIG. 7
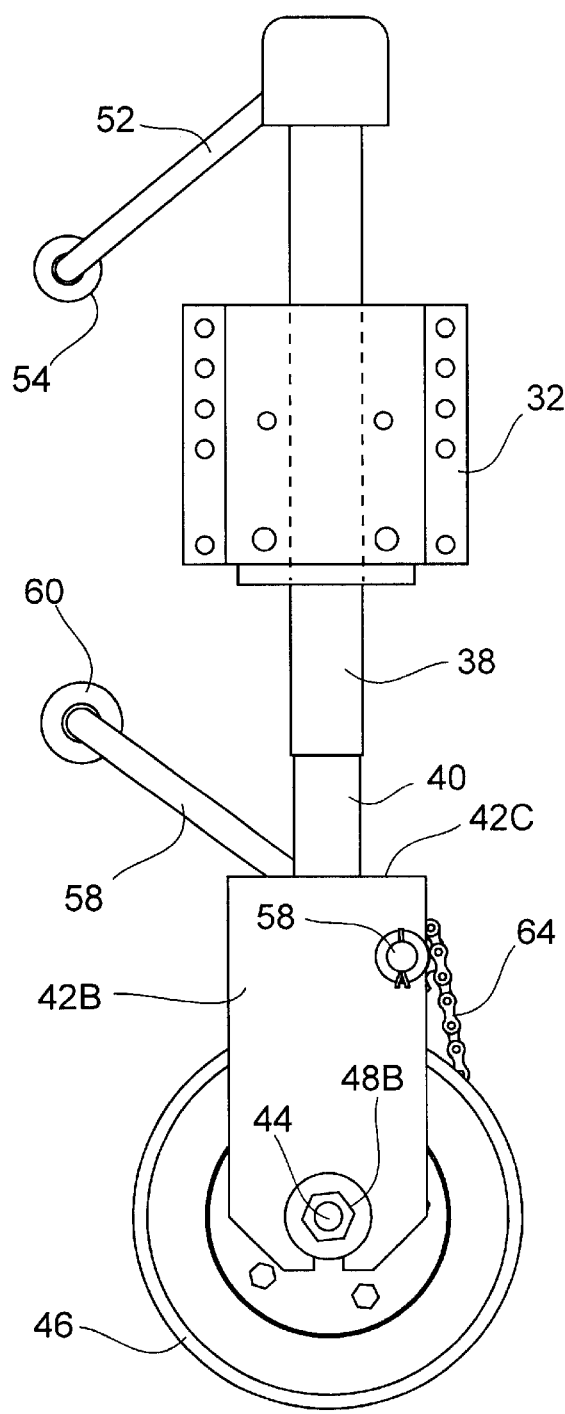
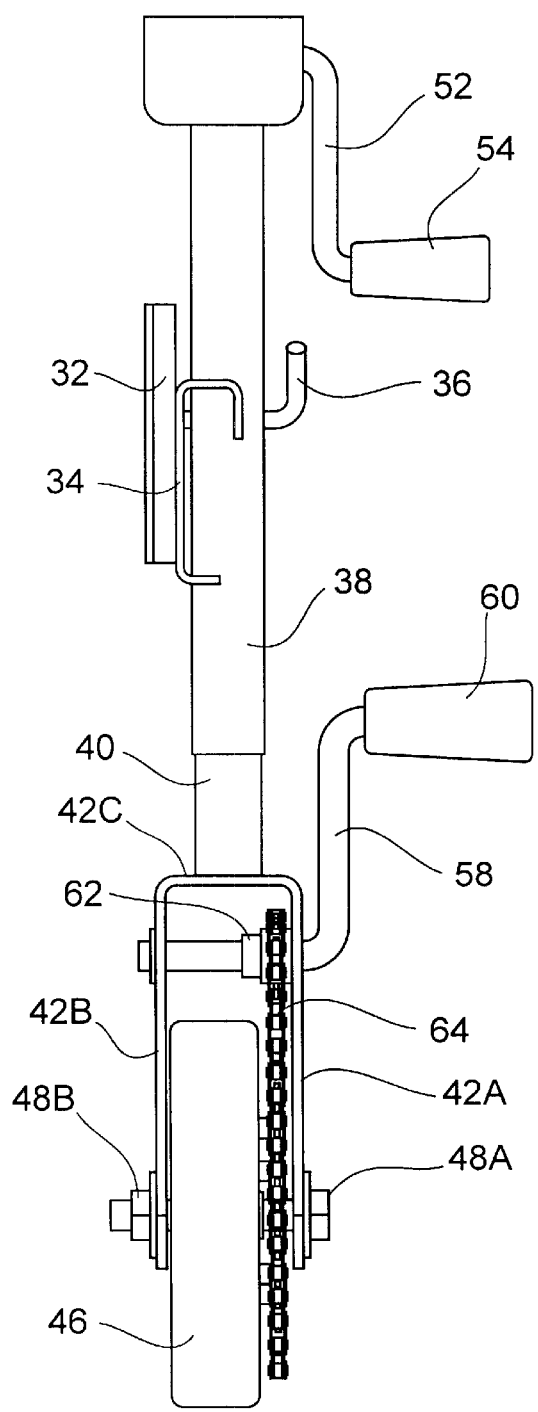

POWER WHEEL FOR A TRAILER TONGUE JACK

REFERENCE TO PENDING APPLICATIONS

This application is not related to any pending United States or international patent application.

REFERENCE TO MICROFICHE APPENDIX

This application is not referenced in any Microfiche Appendix.

FIELD OF THE INVENTION

This invention relates to an improved jack for a horizontally extending trailer tongue.

BACKGROUND OF THE INVENTION

The front end of a trailer is generally supported by a trailer tongue jack when the trailer is parked, that is, not connected to a towing vehicle. The typical trailer tongue jack is secured to a horizontally extending trailer tongue and has a base plate at the lower end of the jack. The jack is usually in the form of an elongated shaft. The shaft typically has an upper portion that is secured to the trailer tongue and a lower portion that is telescopic with respect to the shaft. An upper crank arm that can be rotated about a vertical axis or, in some cases, about a horizontal axis, is utilized to telescopically extend or retract the lower portion of the elongated shaft. As the lower portion of the shaft is telescopically extended or withdrawn with respect to the upper portion, the elevation of the trailer tongue can be varied.

When a vehicle is backed up to engage a trailer hitch that is secured to the forward end of a trailer tongue precise maneuvering is required. A vehicle may be required to back up several times for alignment with the trailer hitch secured to the trailer tongue.

For these reasons a need exists to provide an improved system by which a trailer tongue may be moved so that a trailer hitch on the trailer tongue may be positioned to engage a ball hitch on the rear end of a vehicle.

Others have addressed this problem as revealed in the following previously issued patents:

| Pat. No. | INVENTOR | TITLE |
| --- | --- | --- |
| 3,183,013 | A. P. Brown | Trailer Spotter |
| 5,338,047 | Knisley | Trailer Alignment Device |
| 3,439,764 | H. M. Kimball | Power Caster for Moving Trailers |
| 4,168,074 | Morris | Apparatus for Moving Caravans and Other Trailed Vehicles |
| 4,463,961 | Fernandez | Manually Moving a Trailer |
| 4,470,564 | Johnson | TUG |
| 3,738,672 | Dalton | Dolly for Moving Vehicles |
| 4,416,460 | Morris | Drive Mechanisms |
| 1,373,352 | W. C. Rice | Caster |
| 3,269,740 | E. R. Hutchinson | Vehicle Moving Mechanism |
| 4,210,217 | Lachowicz | Self-Propelled Steering |
| 4,860,841 | Sacco | Device for Maneuvering of Trailers |
| 4,227,706 | Morris | Traction Devices for Towed Vehicles |
| 3,482,847 | M. N. Hart | Trailer Guide Wheel Construction |

A problem exists with trailer tongue jacks as illustrated and described in the above-referenced U.S. Patents. Specifically, there does not exist, to the knowledge of the applicant, a trailer tongue jack that is pivotally affixed to a trailer tongue so that it can be pivoted in a first position in which it is horizontal and substantially parallel to a trailer tongue and pivoted to a second position in which it is vertical, that is substantially perpendicular to a trailer tongue, with a wheel at the lower end thereof and a simple lightweight and effective mechanism by which power can be applied, either manually or by a motor to move the wheel and the wheel guided so that the trailer tongue can be easily moved to alignment with a ball hitch on a vehicle.

Accordingly, an object of this invention is to provide an improved jack for a trailer tongue.

BRIEF SUMMARY OF THE INVENTION

This invention provides an improved jack for a horizontally extending trailer tongue of the type having, at the forward end of the trailer tongue, a trailer hitch that is typically of the type that is attachable and detachable from a ball post affixed to a vehicle.

The improved jack includes a bracket that is attached to a trailer tongue. A longitudinal shaft is supported to the bracket and pivotal between a first position in which the shaft is substantially horizontal and parallel to the trailer tongue and a second position in which the shaft is vertical, that is, at least substantially perpendicular to the trailer tongue. It is in the second position that the trailer tongue jack is used when the trailer is a rest, and also when the trailer tongue jack is used to align the trailer for connection of the trailer hitch to a ball post mounted at the rearward end of a vehicle.

The longitudinal shaft is typically formed of an upper portion and a telescopic lower portion. By means of a first crank arm at the upper end of the longitudinal shaft, the lower portion may be extended or withdrawn telescopically with respect to the upper portion, to thereby, when the shaft is in the vertical position, raise or lower the elevation of the trailer tongue. The lower portion of the elongated shaft is rotatable with respect to the shaft upper portion or, as an alternative arrangement, the shaft upper portion may be rotatably supported to the bracket so that by either means the lower portion of the shaft may be rotated about the shaft longitudinal axis.

Affixed to the lower end of the shaft is a wheel housing. Received by the wheel housing is a wheel that is rotated with respect to the housing about a horizontal axis. A crank arm is rotatably affixed to the wheel housing and has a drive gear that is rotated by the crank arm. A driven gear is affixed the to wheel. The drive gear is interconnected with the driven gear so that when the drive gear is rotated as the crank arm is rotated, the driven gear and thereby the wheel is rotated. In one embodiment, a flexible chain, which typically may be such as a bicycle chain, interlinks the drive gear and the driven gear. Instead of the chain, a belt could be employed. In another embodiment the drive gear is directly coupled to the driven gear. This can be accomplished by teeth on the drive gear directly meshing with teeth on the driven gear or, in an illustrated embodiment, an intermediate gear may be employed so that a direct gear drive with improved mechanical advantage extends between the drive gear and the driven gear. Irrespective of the particular system used for coupling the rotation of the crank arm to turning the wheel, it is important that a mechanical advantage be obtained so that a relatively small force is required to rotate the crank arm to move the wheel and thereby move the trailer tongue when aligning a trailer hitch to a ball post.

In the process of aligning a trailer hitch with a ball post it is nearly always necessary to change the direction of movement of the trailer tongue. Direction change is accomplished by rotating the lower portion of the elongated shaft about its longitudinal axis to thereby change the direction of travel of the wheel. The lower portion of the elongated shaft can be rotated by use of the crank arm or in another embodiment, a guide handle may be extended from the lower portion of the shaft or, more specifically, from the wheel housing. The handle may have a hinged portion so that it can be pivoted out of the way except when being used to guide the direction of travel of the wheel.

A more complete understanding of the invention will be obtained by reference to the following specification of the preferred embodiment. taken in conjunction with the attached drawings.

DESCRIPTION OF THE DRAWINGS

FIG. 1 shows the trailer tongue being maneuvered so that a trailer hitch at the forward end of the trailer tongue may be connected with the ball host secured to a vehicle.

FIG. 4 is an enlarged elevational side view of the improved trailer hitch jack as shown in FIGS. 1–3.

FIG. 5 is a rear view of the improved trailer tongue jack as shown in FIG. 4.

FIG. 6 is a view of the improved trailer tongue jack as seen from the side opposite of that of FIG. 4.

FIG. 7 is a front view of the improved jack.

FIG. 8 shows one means of coupling rotational power from a crank arm to the trailer jack.

DETAILED DESCRIPTION OF A PREFERRED EMBODIMENT

Figure 1:
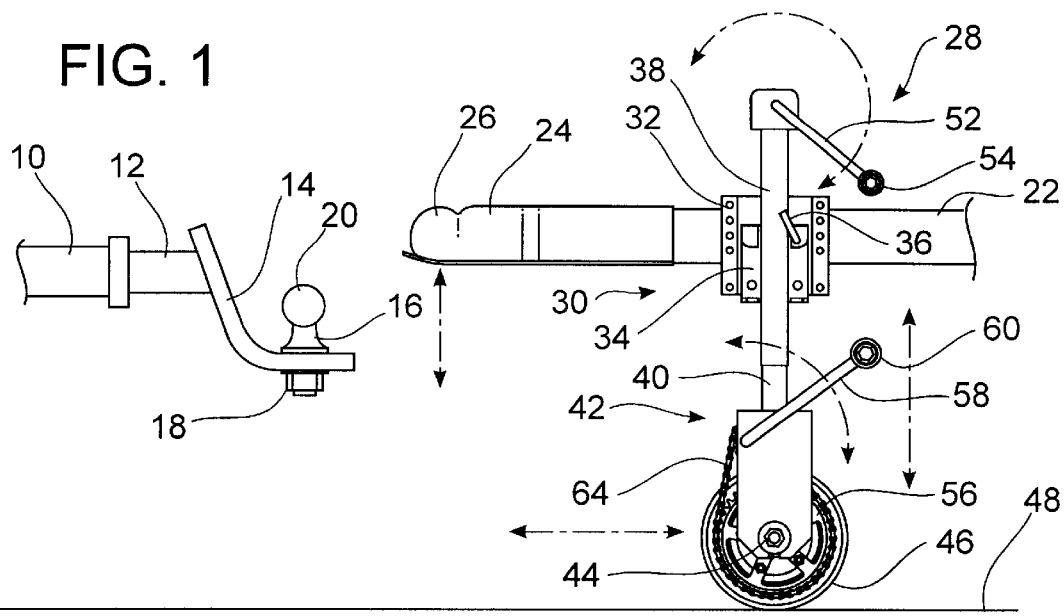
FIG. 1 is an elevational view showing, on the left hand side, a trailer hitch system extending from a vehicle, the trailer hitch system having a post with a trailer hitch ball at its upper end. On the right hand side of the view of FIG. 1 is a portion of a trailer tongue with the improved jack of this invention mounted on it.

Portions of a typical trailer vehicle hitch are shown in the left hand part of FIG. 1. Trailers of the type commonly pulled by vehicles include trailer homes, boat trailers, horse trailers, trash hauling trailers, lawn mowing equipment trailers and so forth. A vehicle trailer hitch typically includes a fixed portion 10 that is permanently secured to the rear end of a vehicle with a removable telescoping portion 12 having a bracket 14 at the outer end thereof Secured to a horizontal portion of bracket 14 is a trailer hitch ball post 16 held by a large nut 18. The upper end of trailer hitch ball post 16 is a spherical ball 20.

Telescoping portion 12 with the other parts of the trailer hitch that are attached to it can be remove from the fixed portion 10 when the trailer hitch is not in use.

The vehicle trailer hitch illustrated by elements 10–20 are not a part of the invention herein but are illustrated to show the environment in which the invention is utilized. A typical trailer has a horizontally extending trailer tongue with a trailer hitch at the forward end that includes a cavity for capturing ball 20. A difficult problem arises when attempting to connect a trailer to a vehicle having a trailer hitch of the elements 10–20 since the trailer hitch must be elevationally aligned above ball 20 before it can be coupled to the ball. The invention herein provides an improved way of interconnecting a trailer with the trailer hitch system of elements 10–20.

In the right hand portion of FIG. 1 is shown a trailer tongue 22 that extends generally horizontally from trailer, the trailer itself not being shown. At the forward end of trailer tongue 22 is a typical trailer hitch 24 that has, at the forward end thereof, a portion that provides a concave socket, only the exterior of a concave housing 26 being shown. To connect trailer tongue 22 to a trailer hitch having elements 10–20, the concave housing 26 must be fitted over spherical ball 20. To assist in accomplishing this purpose, the improved trailer hitch jack of this invention is generally indicated by the numeral 28.

A bracket 30 is used to mount the trailer hitch jack to trailer tongue 20. Bracket 30 typically consists of a fixed portion 32 that is bolted or clamped to trailer tongue 22, and a rotatable portion 34 that pivots in a horizontal plane with respect to fixed portion 32. A retractable pin 36 is used to lock the rotatable portion 34 in one of two positions with respect to fixed bracket portion 32.

Secured to rotatable bracket 34 is a longitudinal shaft upper portion 38. Telescopically extending from a lower end of the shaft upper portion 38 is a shaft lower portion 40. Affixed at a lower end of a shaft lower portion 40 is a wheel housing 42. Mounted about a horizontal axle 44 to wheel housing 42 is a wheel 46 that rests on the earths surface 48. Thus, wheel 46 secured to the lower end of the longitudinal shaft supports trailer tongue 22 above the earth's surface.

The shaft lower portion 40 is telescopically extendable and retractable with respect to the shaft upper portion 38. The extension or retraction is controlled by a first crank arm 52 having a handle 54. As crank arm 52 is rotated shaft lower portion 40 is retracted or extended according to the direction of rotation. This extension or retraction is obtained by a gearing arrangement between crank arm 52 and an externally threaded member within upper shaft portion 38, the details which are not illustrated since this arrangement is commonly known to the industry. As illustrated in FIGS. 1–7, first crank arm 52 rotates in a vertical plane, about a horizontal axis, however, many trailer jacks have a system wherein the first crank arm rotates in a horizontal plane about a vertical axis to extend or retract shaft lower portion 40 to raise or lower trailer tongue 22.

Figure 8:
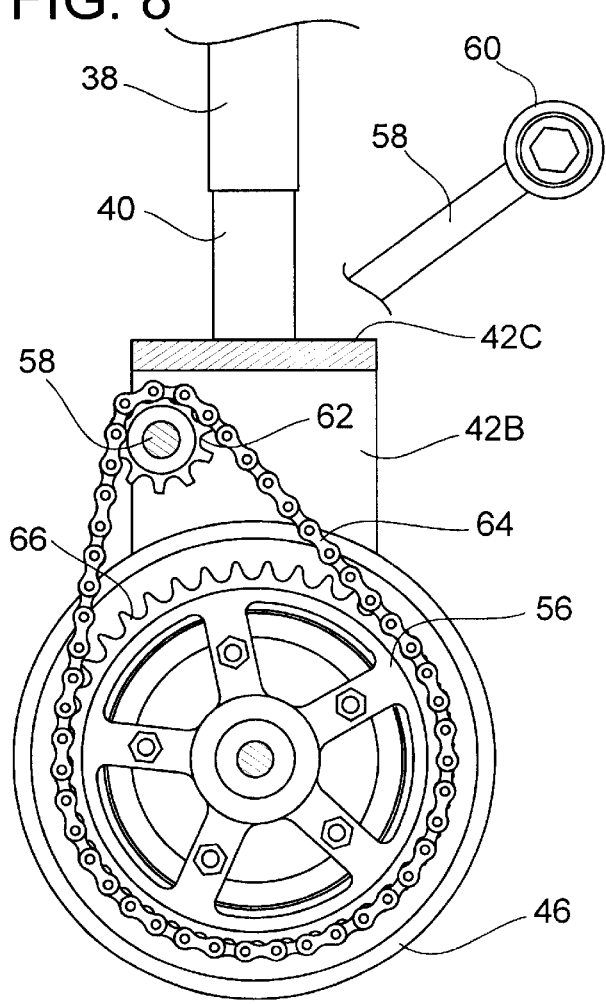
FIG. 8 is a fragmentary view of the lower portion of the improved trailer tongue jack showing one embodiment in which a chain, such as a bicycle chain, is used to couple a drive wheel that is rotated by a crank arm to a driven wheel secured to the trailer jack wheel.

An important part of this invention is the provision for rotating wheel 46 so that trailer tongue 22 may be moved over the earth's surface to facilitate connecting trailer hitch 24 to ball post 16. Affixed to wheel 46 is a driven gear 56 as seen best in FIGS. 1, 4, 5, 7, 8 and 9. Rotatably supported to wheel housing 42 is a second crank arm 58 having a handle 60 by which the crank arm is rotated. As best seen in FIGS. 5, 7, 8 and 9 there is, affixed to the inner end of crank arm 58 a drive gear 62. Looping around drive gear 62 and driven gear 56 is a chain 64 that may, as example, be in the form of a bicycle chain. Drive gear 56 and driven gear 62 may have teeth like the sprockets of a bicycle gear to receive chain 64. Specifically, FIG. 8 shows driven gear 56 with teeth 66 configured to be engaged by a bicycle type chain 64.

Instead of a chain 64 the same arrangement could be made using a drive belt in which case drive gear 62 and driven gear 56 would be in the form of shivs or pulleys to receive a drive belt, but the function would be the same as illustrated.

As crank arm 58 rotates wheel 46 trailer tongue 22, and correspondingly the trailer to which it is secured, can be moved over the earth's surface 48 so that trailer hitch 24 can be in position to fit down upon trailer hitch post spherical ball 20.

Figure 2:
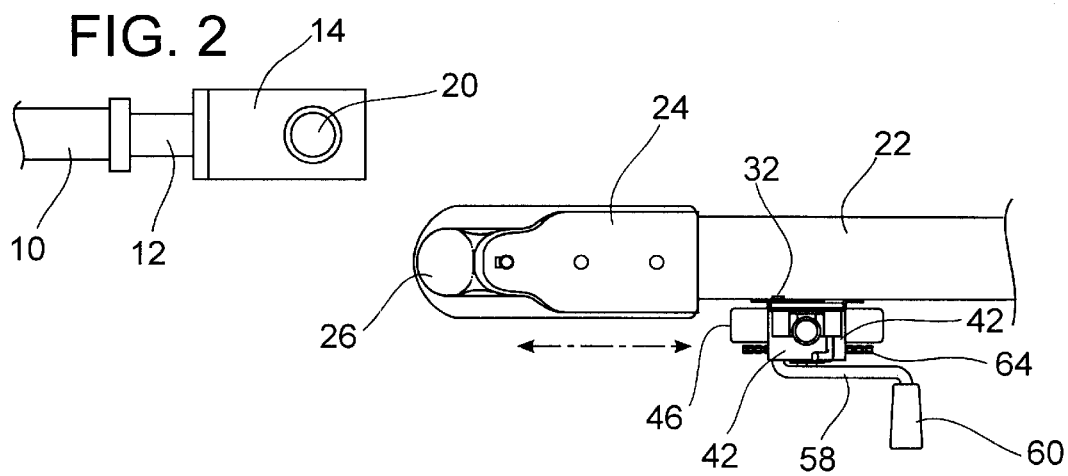
FIG. 2 is a top view of the system of FIG. 1 showing on the left hand portion of the view the trailer hitch secured to a vehicle and showing on the right hand portion the trailer tongue with the improved jack of this invention.
Figure 3:
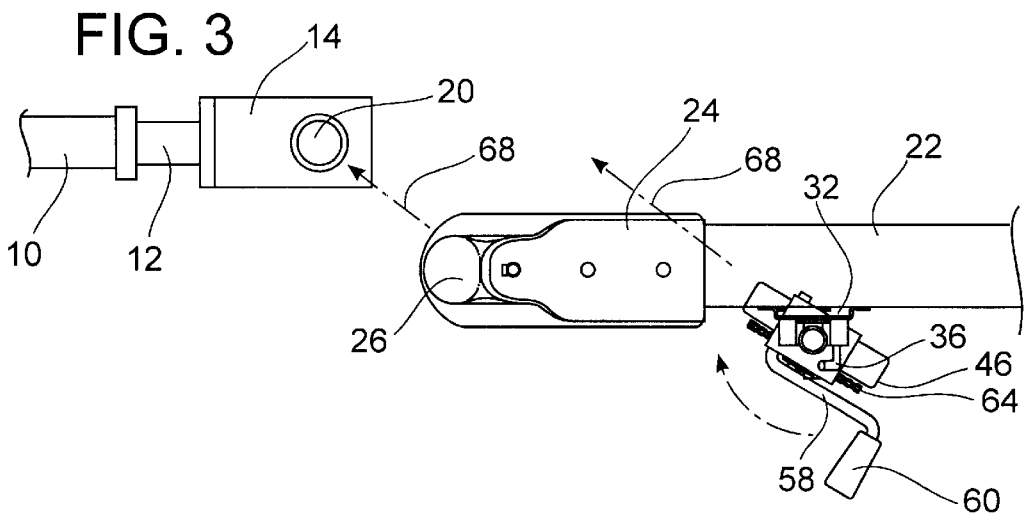
FIG. 3 is a further view of FIG. 2 showing how the improved jack of this invention is utilized to maneuver a trailer tongue so that the trailer hitch can be secured to a ball post on a vehicle.

FIG. 2 is a top plan view showing the trailer hitch structure on the left and showing the trailer tongue 22 and so forth on the right. FIG. 2 shows wheel housing 42 and wheel 46 aligned parallel to tongue 22 so that if crank arm 58 is rotated wheel 46 would move the trailer in a direction for or aft of tongue 22, as indicated-by an arrow. To align the concave socket 26 of trailer hitch 24 with spherical ball 20, the trailer tongue must be moved not only forwardly but also laterally in a direction indicated by arrows 68 as shown in FIG. 3. By rotating the shaft lower portion 40 to the angles indicated by arrows 68 and rotating crank arm 58, wheel 46 will move trailer tongue 22 and trailer hitch 24 so that the concave socket housing 26 can be moved directly over spherical ball 20. When directly over the spherical ball the first crank arm 52 may be rotated to telescopically withdraw lower portion 40 of the shaft to reduce the height of trailer tongue 22 so that the concave socket housing 26 settles down over spherical ball 20. Trailer hitch 24 normally has a mechanism for latching it onto spherical ball 20. Such latching mechanism is not shown since this is a commonly practiced procedure for all trailer hitches required for safety purposes and therefore the details of the trailer hitch latch are not part of this invention.

Figure 9:
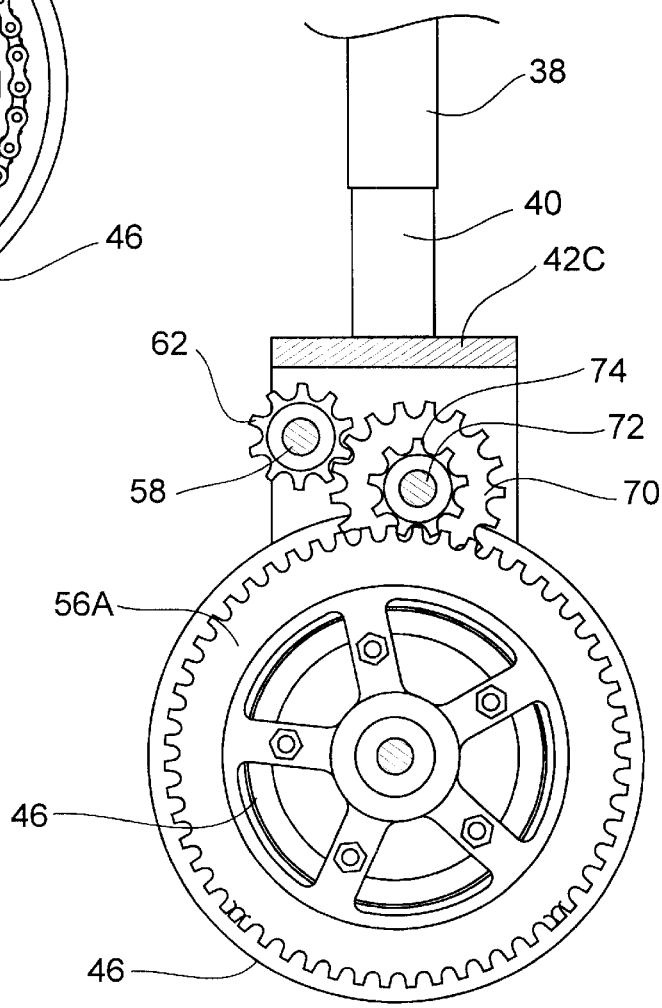
FIG. 9 is a fragmentary view as in FIG. 8 but showing an alternate arrangement for coupling power from a crank arm to rotate the trailer jack wheel in which the method of coupling uses intermediate gears.

As previously stated, drive gear 62 that is rotated by second crank arm 58 may be coupled to driven gear 62 to rotate wheel 46 either by means of a chain or a belt. A third means of coupling the rotation of second crank arm 58 to wheel 46 is by direct gear drive as illustrated in FIG. 9. In FIG. 9, a chain or belt is not employed and instead an intermediate gear 70 that rotates about shaft 72 is mounted within wheel housing 42. It can be seen that intermediate gear 70 may be dimensioned so that it directly couples between drive gear 62 and driven gear 56A, however, in the embodiment illustrated in FIG. 9, a second intermediate gear 74 is used. Gear 74 is mounted on shaft 72. Intermediate gears 70 and 74 are locked for rotation with each other. The arrangement of FIG. 9 is important for two reasons. First, it shows direct gear drive between driven gear 56A and the drive gear 62. Second, a means of increasing the mechanical ratio between rotation of second crank arm 58 and the rotation of driven gear 56A is achieved. By employing a primary intermediate gear 70 and a secondary intermediate gear 74 the gear ratio between the rotation of second crank arm 58 and the rotation of wheel 46 is substantially increased so that if the trailer jack is used on a large or heavy trailer the trailer can be moved even by a small person rotating crank arm 58.

Any method of coupling the rotation of a crank arm to drive wheel 46 is within the scope of the invention. In the illustrated embodiments herein wheel 46 is rotated by means of crank arm 58. Instead of a manually rotated crank arm, the drive gear 62 could be rotated by an electric motor. Any means of rotating the drive gear that would cause wheel 46 to rotate to move trailer tongue 22 would be within the scope of the invention.

Wheel housing 42 is in the form of an integral plate having vertically extending side walls 42A and 42B that are parallel to each other. The plate may be made of a single piece of metal, such as steel, bent into a U-shape in which the bite portion 42C is integral with the side portion 42A and 42B. A wheel housing of such U-shaped construction, whether made of one piece or more than one piece, has advantages in that it provides an easy way to attach the lower end of shaft lower portion 40 to the housing and provides a convenient way for supporting axle 44 that may, as illustrated, be in the form of a bolt having a head 44A and a nut 44B. In addition, second crank arm 58 is conveniently rotatably supported by side walls 42A and 42B.

Comparing FIG. 2 and FIG. 3 shows the importance of guiding the direction of travel of wheel 46, the direction of wheel travel is easily achieved by rotating wheel housing 42 which, unless the trailer is very heavy, can normally be accomplished by using leverage supplied by second crank arm 58. However, if additional leverage is required to conveniently change the direction of wheel 46, a steering lever 76 may be employed as shown in FIGS. 4 and 5. Steering lever 76 has an inner end that is attached directly to the bite portion 42C of wheel housing 42. In the preferred arrangement as illustrated, steering lever 76 has a pivoted outer portion 78 with a handle 80. When not in use the pivoted outer portion 78 can hang down vertically as shown in FIG. 4, but when the steering lever is needed to guide wheel 46, the outer portion is pivoted to the horizontal position as shown in dotted outline in FIG. 4 to make it easy to guide the wheel when a trailer is being moved to be attached to a towing vehicle.

Rotation of wheel 46 must impose sufficient traction on the earth's surface 48 to cause the trailer to which tongue 22 is attached to move. If a trailer is parked in an area wherein there is little traction between wheel 46 and the earth's surface, such as if the trailer is parked on grass, dirt or gravel, then it is important that provision be made so that ample friction is achieved to move the trailer. This can easily be accomplished by employing a sheet of flat material such as a sheet of plywood that can be placed on the earth's surface 48 before wheel 46 is brought into engagement with it. Thus, if a trailer is parked in an area where the earth provides low traction then before the trailer is unhitched from the vehicle which has parked the trailer, a sheet of plywood or similar material can be placed down so that when the jack is moved into position to remove the trailer hitch from the towing vehicle wheel 46 will rest on the plywood or other sheet material. In this way, when it comes time to reconnect the trailer to a vehicle movement of the wheel can take place entirely upon a sheet of material ensuring that good traction is provided for moving the short distance necessary to effect a hook up of a trailer hitch to a vehicle trailer hitch ball.

An important aspect of the invention herein is that wheel 46 is directly underneath the longitudinal axis of shaft 38 including the shaft telescoping lower portion 40 so that no lateral forces are applied to the shaft or to the bracket 32, 34 by which it is supported. Further, although not illustrated in the drawings, a latch can be provided to prevent the inadvertent rotation of the second crank arm 58 to thereby lock wheel 46 in position. This would be important if a trailer is parked on an uneven surface so that the trailer might inadvertently move. In other words, the trailer tongue jack of this invention having a power wheel can easily be arranged so that the wheel is locked in position to provide a safety feature. The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An improved jack for a horizontally extending trailer tongue comprising:
    a bracket attachable to a trailer tongue;
    a longitudinal shaft pivotally supported to said bracket and pivotal between a substantially vertical position and a substantially horizontal position in which the shaft extends substantially parallel to the trailer tongue;
    a wheel housing supported at one end of said shaft;
    a wheel rotatably supported by said housing, a lower portion of said shaft being rotatable about a shaft longitudinal axis;
    a crank arm rotatably extending from said housing and having a drive gear thereon; and
    a driven gear affixed to said wheel, said driven gear being coupled for rotation when said drive gear is rotated to cause said wheel to rotate for moving said trailer when said wheel is in contact with the earth's surface.

2. An improved jack for a horizontally extending trailer tongue according to claim 1 wherein said longitudinal shaft includes an upper portion pivotally supported to said bracket and a telescopic lower portion that extends from said upper portion by which the length of said longitudinal shaft may be adjusted and accordingly the distance of the trailer tongue above the earth's surface may be controlled.

3. An improved jack for a horizontally extending trailer tongue according to claim 1 including a flexible force transfer member extending around said drive gear and said driven gear.

4. An improved jack for a horizontally extending trailer tongue according to claim 3 in which said flexible force transfer member is a chain.

5. An improved jack for a horizontally extending trailer tongue according to claim 1 wherein said drive gear directly contacts said driven gear.

6. An improved jack for a horizontally extending trailer tongue according to claim 5 wherein said drive gear is coupled to said driven gear by an intermediate gear whereby the gear ratio between said drive gear and said driven gear is increased.

7. An improved jack for a horizontally extending trailer tongue according to claim 1 including a handle extending from said lower portion of shaft for guiding the direction of travel of said wheel.

8. An improved jack for a trailer tongue comprising:
    a longitudinal shaft pivotally supported to the trailer tongue and pivotal between a horizontal position in which said shaft is substantially parallel to said trailer tongue and a vertical position in which said shaft may be used to support said trailer tongue;
    a wheel rotatably supported by a lower portion of said shaft, said shaft lower portion being rotatable about a shaft longitudinal axis;
    a crank arm rotatably secured to said lower portion of said shaft; and
    a rotation transfer system interconnecting the rotation of said crank arm with the rotation of said wheel whereby when said wheel is engaged with the earth's surface the trailer tongue can be moved by the rotation of said crank arm.

9. An improved jack for a trailer tongue according to claim 8 including a handle extending from said lower portion of said shaft for guiding the direction of travel of said wheel.

10. An improved jack for a trailer tongue according to claim 8 including a wheel housing affixed to said lower portion of said shaft and wherein said wheel is rotatably supported by said wheel housing.

11. An improved jack for a trailer tongue according to claim 10 wherein said crank arm extends from said wheel housing.

12. An improved jack for a trailer tongue according to claim 8 wherein said rotation transfer system including a drive gear secured to and rotated by said crank arm and including:
    a driven gear affixed to said wheel, said driven gear being coupled for rotation by said drive gear to cause said wheel to rotate.

13. An improved jack for a trailer tongue according to claim 8 wherein said shaft includes an upper portion supported to the trailer tongue and wherein said lower portion telescopically extends from said upper portion by which the length of said longitudinal shaft may be adjusted and accordingly the distance of the trailer tongue above the earth's surface when supported by said wheel may be controlled.

14. An improved jack for a trailer tongue according to claim 12 including a flexible force transfer member extending around said drive gear and said driven gear.

15. An improved jack for a horizontally extending trailer tongue according to claim 14 in which said flexible force transfer member is a chain.

16. An improved jack for a horizontally extending trailer tongue according to claim 12 wherein said drive gear directly contacts said driven gear.

17. An improved jack for a trailer tongue according to claim 12 wherein said drive gear is coupled to said driven gear by an intermediate gear whereby the gear ratio between said drive gear and said driven gear is increased.

* * * * *